United States Patent Office 3,568,384
Patented Mar. 9, 1971

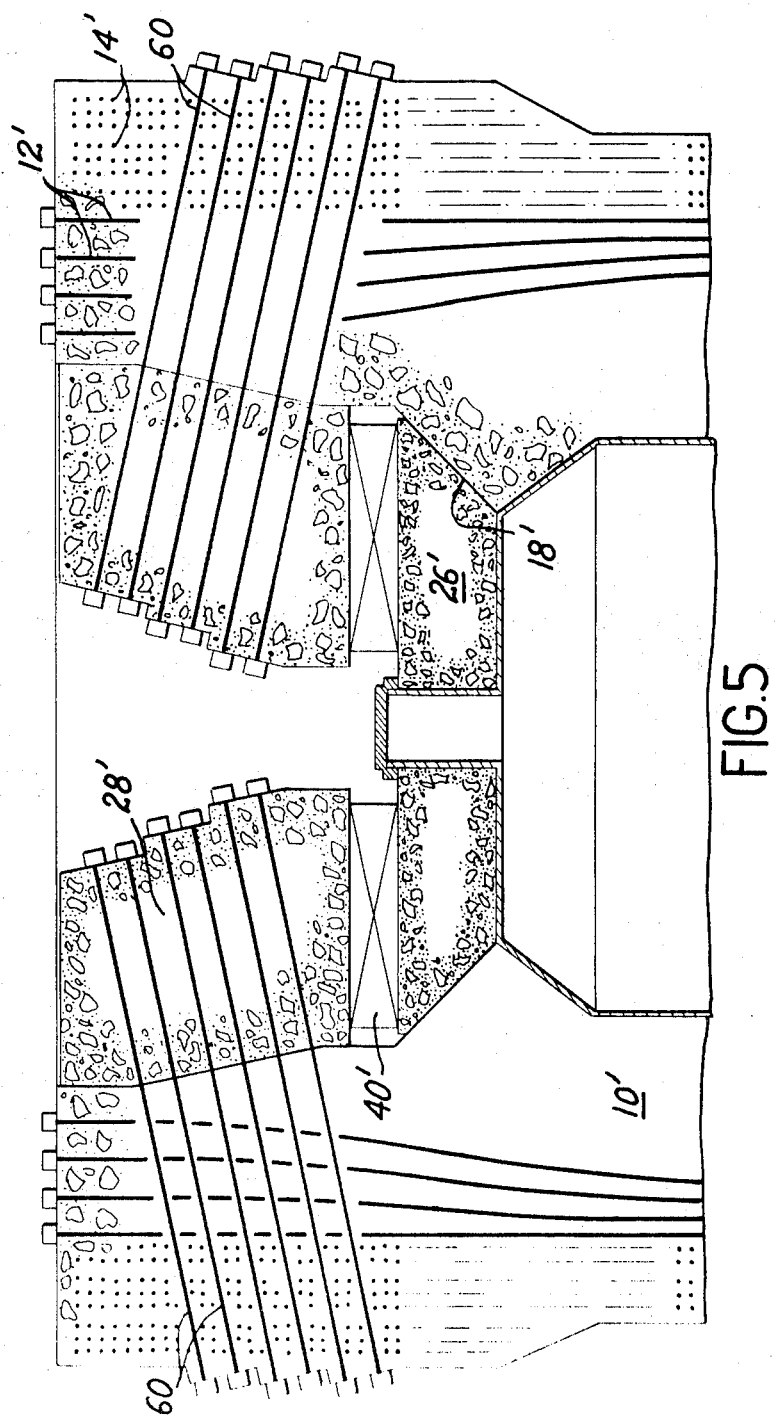

3,568,384
PRESTRESSED CONCRETE PRESSURE VESSEL
Jean-Louis Cruset, Paris, and Pierre Launay, Versailles, France, assignors to Commissariat a l'Energie Atomique, Paris, France
Filed June 27, 1968, Ser. No. 740,637
Claims priority, application France, July 3, 1967, 112,909
Int. Cl. E04c 3/26
U.S. Cl. 52—224   9 Claims

ABSTRACT OF THE DISCLOSURE

A substantially cylindrical pressure vessel has at least one removable end structure so as to provide an opening which practically corresponds in diameter to the interior of the vessel. The removable end structure comprises from the interior to the exterior of the vessel in the axial direction an outwardly-flared bearing face formed on a cornice of the internal vessel wall, a removable slab tightly applied against the bearing face, a flared abutment face formed in the internal vessel wall and an assembly of wedge-shaped elements each occupying an angular sector and forcibly applied against the abutment face. The removable slab is applied against the bearing face with variable pressure by means of first jacks mounted between the slab and the wedge assembly. The wedge assembly is applied against the abutment face either by means of second jacks mounted between the cornice and the assembly or by means of tensioned cables passed through the cylinder wall at right angles to the abutment face.

---

This invention relates to prestressed concrete pressure vessels for nuclear reactors and in particular to vessels of this type which comprise a cylindrical shell and end-walls, at least one end-wall being removable in order to provide an opening whose diameter is of the same order as that of the compartment which is limited by the pressure vessel. The terms "cylindrical shell" or "vessel cylinder" which appear throughout this specification must be interpreted as designating not only a circular cross-sectional shape but also, as is usually the case with pressure vessels, a cross-sectional shape having a periphery with polygonal portions for the purpose of anchoring prestressing cables.

When a prestressed concrete pressure vessel is employed in order to provide resistance to the operating pressure of a reactor coolant, provision must be made for servicing and repair work on components which are located within the vessel. At least in some types of reactor, a possibility must be allowed for the periodic replacement of bulky components such as fuel assemblies. This is the case in particular of boiling water reactors or pressurized water reactors which are usually designated by the abbreviations BWR and PWR.

It has already been proposed to provide for a removable end-wall in a nuclear reactor pressure vessel of the prestressed concrete type. In one proposed design which is particularly worthy of mention, the end-wall was made up of a slab applied against an annular assembly of wedge-shaped elements which were secured to the cylindrical shell. The slab had one lateral face which was adapted to bear on the wedge-shaped elements and was flared towards the interior of the pressure vessel.

The angle of slope of said bearing face was chosen so that the radial forces exerted on the cylinder at the time of approach to full pressure are balanced along the entire cylinder and so that bending stresses do not arise. However, this solution suffers from a major defect: at the time of approach to full pressure and temperature, the pressure vessel swells and, in order to maintain the bearing, the slab moves outwards with respect to the vessel cylinder (over a distance of several centimeters in the case of a power reactor vessel). Consequently, loss in leak-tightness is liable to occur as a result of fracture of the membrane with which the pressure vessel is lined and at the level of the point of junction between the cylinder and the slab.

The invention is primarily directed to the design concept of a pressure vessel in which provision can be made in one of the vessel ends for an opening having a substantial transverse dimension of the same order as the transverse dimension of the compartment which is limited by the pressure vessel while circumventing the disadvantage referred-to above. Accordingly, the invention proposes a prestressed concrete vessel which is designed to afford resistance to the pressure developed within a compartment which is defined by said vessel, wherein said vessel comprises a cylindrical shell and end-walls, at least one end-wall being removable so as to leave an opening having a diameter of the same order as that of the compartment, and wherein said removable end-wall comprises:

A bearing face formed on the vessel cylinder, said face being inclined to the axis and flared towards the exterior, and an abutment face which is also inclined to the axis, said bearing and abutment faces being disposed in this order from the interior to the exterior of the pressure vessel;

A removable slab having a lateral surface which corresponds in shape to that of the bearing face;

A plurality of wedge-shaped elements which are separated by spaces and each adapted to occupy an angular sector, said elements being intended to be applied and rigidly maintained against said bearing face; and a plurality of jacks mounted between the wedge elements and the slab and adapted to exert on said slab a variable force of application against the bearing face.

It will be understood that the invention applies to pressure vessels of the vertical axis type as well as to horizontal pressure vessels and that, in the case of vertical vessels, the removable end may be either the top or bottom end-wall although the former is usually preferred for reasons of convenience of operation.

The bearing face may be either frusto-conical, frusto-pyramidal, faceted or may in a more general sense have any shape which permits of interengagement and provides a satisfactory bearing surface.

In a first mode of application of the invention, the means which are intended to lock the wedge-shaped elements are constituted by jacks placed between an annular cornice of the cylinder and the wedge elements in order to lock these latter against the inwardly-flared abutment face.

In a second mode of application of the invention, the wedge elements are maintained applied against the abutment face by prestressing cables or rods which pass through the vessel cylinder, the abutment face being provided with a general inclination which is substantially perpendicular to the cables or rods and flared towards the exterior.

A better understanding of the invention wil be obtained from the following description of embodiments of the invention which are given by way of non-limitative example, reference being made to the accompanying drawings, in which.

Figure 1:
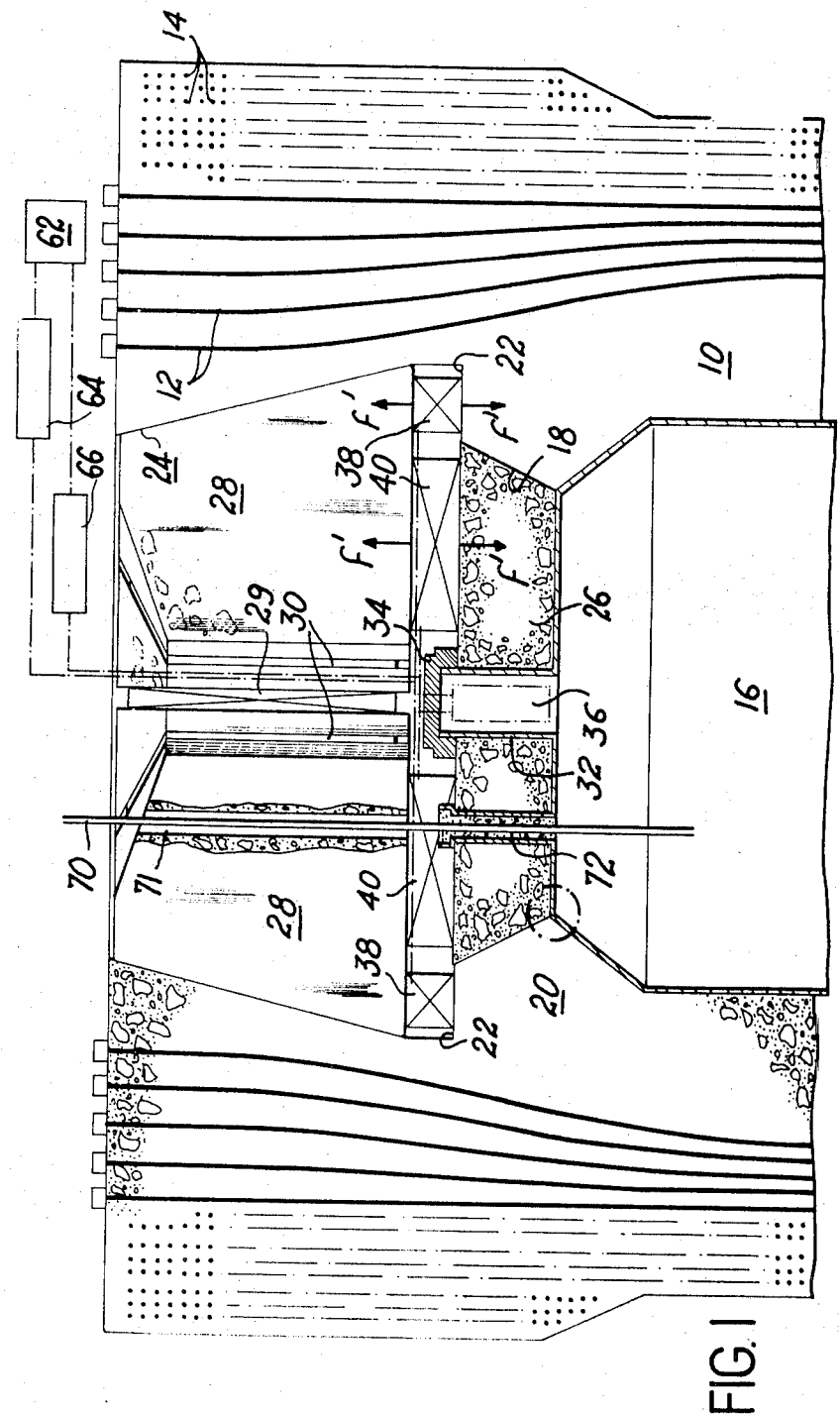
FIG. 1 is a diagrammatic sectional view on the vertical mid-plane taken along the line I—I of FIG. 2 and showing the top portion and removable end of a vertical pressure vessel.
Figure 3:
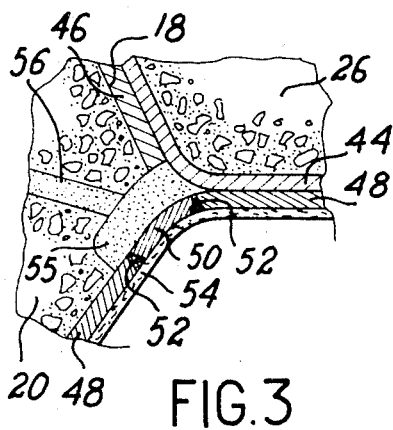
FIG. 3 is a detail sectional view taken on the plane of FIG. 1 and showing the mode of connection of the lining membrane at the point of junction between the slab of the removable end and the vessel cylinder.
Figure 4:
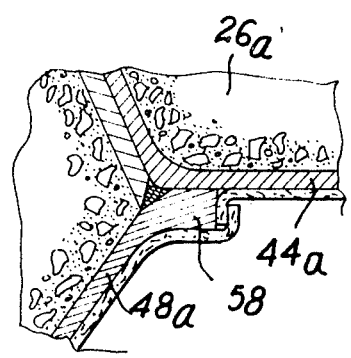

FIG. 4, which is similar to FIG. 3, shows an alternative form of construction which is preferable when frequent disassembly of the vessel end is to be contemplated during the life of the reactor;

FIG. 5, which is similar to FIG. 1, shows an alternative embodiment of the invention.

The prestressed concrete pressure vessel, the top portion of which is illustrated in FIG. 1, comprises a substantially cylindrical shell structure 10 to which prestress is applied by longitudinal cables such as the cable 12 and circumferential or hoop cables such as 14. These cables are of any usual type and may or may not receive an injection of grout whilst the tension applied to the cables does not usually require to be changed each time the vessel end is assembled or disassembled.

The cylinder 10 which extends to the full height of the reactor vessel constitutes the lateral wall of a compartment 16 which is intended to accommodate the reactor core and in which is maintained a pressure of coolant which can be a gas, a vapor or fluid in both phases (liquid and vapor).

Above the compartment 16, the vessel cylinder is provided with a bearing face 18 which is flared towards the top and is of frusto-conical configuration in the embodiment which is illustrated in FIG. 1. Said bearing face is formed on an internal cornice 2 which has a flat top surface 22. The passageway between the compartment 16 and the top face of the pressure vessel has its opening on a downwardly-flared abutment face 24 which is also of frusto-conical configuration in the embodiment which is illustrated in FIGS. 1 and 2.

A slab 26 is adapted to rest on the bearing face 18. The lateral wall of said slab has a shape which corresponds to that of the face 18 and a state of surface which is such that the successive applications of pressure to which it is subjected during successive assembly and disassembly operations in no way affect its capability of displacement with respect to its bearing faces. This state of surface can be obtained by treatment of the concrete in the mass, by covering with steel or with synthesis materials, or by any other means. The ability of the lateral wall and of the bearing face to slide one over the other can be increased by interposition of a product which has a low coefficient of friction.

Figure 2:
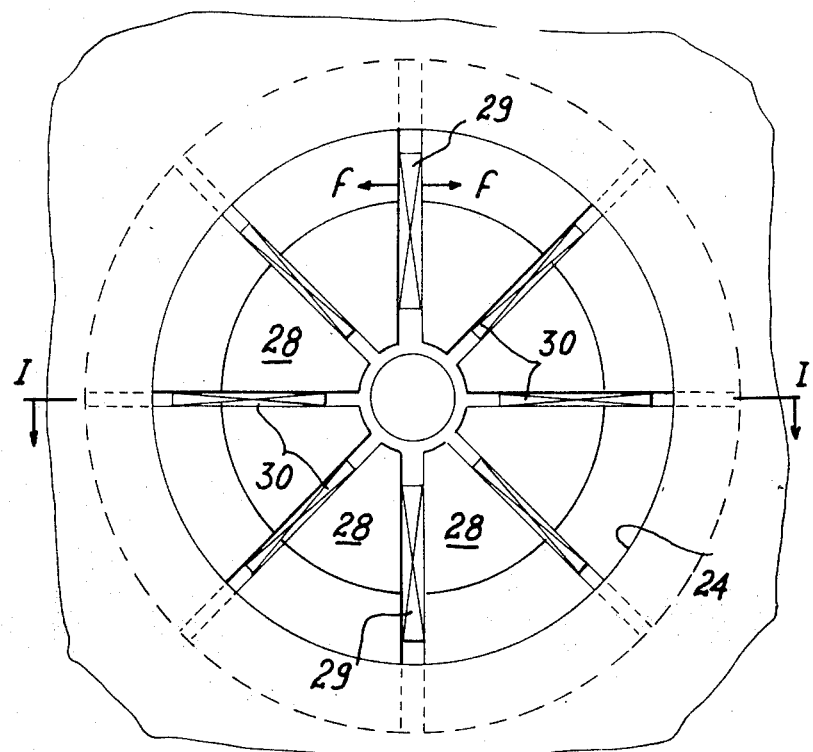
FIG. 2 is a top view of the pressure vessel of FIG. 1.

Positional maintenance of the slab 26 is ensured by a device comprising a plurality of wedge elements 28 (eight in the case of FIGS. 1 and 2). The number of said wedge elements is a function of the maximum load which can be imposed on the lifting means available. The wedges are defined geometrically as the division into sectors of a cone frustum in the case illustrated in FIGS. 1 and 2. However, they could also have the shape of sectors of pyramid frustums or of any other suitable volume. A space is formed between two adjacent wedge elements. Jacks 29 which produce action in the direction of the arrows $f$ (as shown in FIG. 2) are placed in at least some of the spaces referred-to, or in all of said spaces. However, as shown in FIG. 2, provision need be made only for two jacks 29 whilst the other spaces are taken up by packing blocks 30. The presence of the jacks permits disassembly even in the event of jamming.

The radial length of the wedge elements is such that there remains an axial cylindrical passageway which permits the insertion of the wedge elements and provides access to a bore 32 which is formed in the axis of the slab 26 and closed by a sealing cap 34 which carries a biological shield plug 36.

As shown in FIG. 1, jacks 38 are mounted between the wedge elements 28 and the cornice 20 and are intended to apply the wedge elements 28 against the abutment wall 24. The packing blocks 30 and jacks 29 are so designed as to prevent any movement of one wedge element relative to another at the time of upward sliding motion which is imposed by the jacks 38.

Jacks 40 which exert a vertical force in the same manner as the jacks 38 as indicated by the arrows $f'$ in FIG. 1 make it possible to apply the slab 26 against the bearing face 18. The jacks 38 and 40 must be provided with devices for locking them in position once the design stress has been applied. To this end, it is possible in particular to utilize hydraulic control jacks supplied through pipes and fitted with locking mechanisms such as a non-reversible screw and nut connection (not shown) which is controlled by an electric motor. The supply pipes can extend along the axis then radially along the path shown in chain-dotted lines in FIG. 1.

As shown in FIG. 1, the area over which the wedge elements 28 slide against the vessel cylinder (namely the abutment face 24) is appreciably larger than the surface area of the slab 26 (bearing face 18). This arrangement takes into account the fact that there is no problem of ensuring imperviousness either to the coolant or to radiations in the case of the wedge elements 28 whereas this problem is of major importance in the case of the slab 26 and the fact that access to the wedge elements 28 is easier than to the slab 26.

The process involved in mounting the vessel end is as follows:

When the members for applying prestress to the stationary end-wall and the vessel cylinder (cables 12 and 14) have been tensioned to their nominal stress, the slab 26 is laid on the bearing face 18; the jacks 38 and 40 which are fully depressurized are placed in position; the wedge elements 28 are each introduced in turn and placed over the jacks 40; the jacks 29 and the packing blocks 30 are inserted within the spaces formed between the wedge elements. All the jacks must obviously have sufficient coefficients of safety not to incur any risk of failure when a force of lower magnitude than that which would cause fracture of the slab 26 is exerted on this latter.

The jacks 29 are actuated first in such a manner as to apply the outer surfaces of the wedge elements against the bearing face 24 of the cylinder 10. Once the wedge elements are in contact with the abutment face, the jacks 29 are locked.

The vertical thrust jacks 38 are actuated in their turn in order to apply prestress to the wedge elements as a result of sliding motion over the flared abutment face 24. If the bursting forces caused by this action on the vessel cylinder are excessive, it is possible to increae the prestress applied to a given number of cables 14 or tension can be applied to additional cables for circumferential prestressing of the cylinder. When the stresses induced in the wedge elements 28 are of sufficient magnitude, the jacks 38 are locked in their turn and the jacks 40 are put under pressure, are applied against the wedge elements 28 and press the slab 26 against the bearing face 18. By virtue of the conicity of said bearing face, a radial prestress is developed within the slab 26 under the action of the jacks 40. When the prestress has reached a sufficient value, the jacks 40 are locked. The slab 26 has then reached its lowermost position which will remain final throughout the subsequent operation of the reactor. This feature was not present in earlier designs of pressure vessels with removable ends and is essential to the achievement of a high standard of leak-tightness at the point of junction between the slab 26 and the cylinder 10. Satisfactory strength of lining membrane is thus ensured and any danger of leakage is eliminated, even in the event of failure of said lining membrane.

When all the structural elements of the reactor are thus in position, the portions of the lining membrane which are carried by the vessel cylinder and by the slab can be joined together.

Depending on the type of reactor under consideration, preferance can be given to one of a number of different arrangements. FIGS. 3 and 4 show by way of example a welded joint for a reactor which calls for infrequent disassembly and a joint which is primarily intended for a reactor which requires frequent opening operations: the first case applies, for example, to a boiling heavy water reactor and the second case applies to a pressurized light water reactor in which the pressure vessel must be opened at intervals of approximately six months for the purpose either of refueling the reactor or re-distributing the fuel assemblies.

It is understood that systems are provided for the insertion of control rods through the cover. For example, the control rods 70 are capable of sliding freely within ducts 71 formed in the top wedge elements, are adapted to pass between the jacks 40 and are engaged within tubes 72 which are anchored in the slab 26.

FIG. 3 shows diagrammatically the zone surrounded by a circle in chain-dotted lines in FIG. 1 and extending over a portion of the cornice 20 and of the slab 26. The slab 26 which is illustrated carries a lining membrane 44 and the lateral wall of said slab is adapted to rest on a shell-plate 46 which covers the bearing face 18. The leak-tight lining membrane 48 which is carried by the internal wall of the cylinder 10 and the removable membrane 48 which is joined to the slab 26 are coupled together by means of a steel band 50 which is secured by weld fillets 52 formed from inside the pressure vessel. Continuity of the heat insulation 54 is then restored.

Once the band 50 is in position, an annular cavity 55 which is reserved between the vessel cylinder and the band is filled with concrete grout or like material which is injected through a passageway 56.

In the form of execution which is illustrated in FIG. 4, the junction between the lining membranes is carried out simply by applying the membrane 44a which is carried by the slab 26a against an internal annular projection 58 of the lining membrane 48a of the cylinder. Continuity of the heat insulation is ensured by simple interengagement.

Once the continuity of the membrane is established, the reactor is then brought to full pressure and temperature. As soon as the pressure begins to rise, the jacks 38 are released and the pressure which prevails therein is reduced progressively as the pressure rises within the compartment 16. The variation in pressure within the jacks 38 can be controlled in such a manner as to prevent any displacement of the slab 26 with respect to the cylinder 10. The respective angles of slope of the bearing face 18 and abutment face 24 are preferably chosen so that said displacement should be zero. The control operation is carried out either in order to maintain at a constant value the pressure with which the lab 26 is applied against the bearing face 18 or to compensate for any displacement of the slab 26 with respect to the cylinder 10.

It should be noted in this connection that any faulty operation of the jacks 38 during this operation has the effect of increasing the contact pressure of the slab 26 against the face 18 and cannot be the cause of leakage.

Once the operating pressure is attained, the jacks 38 are again locked. During operation of the reactor, all the jacks may be left in the locked condition if necessary. However, in order to overcome the effects of a temporary overpressure within the compartment 16, is is usually preferable to provide a safety system 62 which controls either a valve 64 for the purpose of reducing the pressure within the jacks 38 or a valve 66 for the purpose of increasing the pressure within the jacks 40 or which carries out both operations at the same time in the event of an increase in coolant pressure above the normal operating pressure.

Operations involved in the disassembly of the vessel end are obviously carried out in the reverse order to those which have been described, preceded by the destruction of the sealing joint in the case of the form of execution which is illustrated in FIG. 3; this destruction is carried out by flame-cutting of the welds 52 and therefore calls for entry by personnel into the pressure vessel after cooling and long-term shutdown of the reactor.

The alternative form of construction which is illustrated in FIG. 5 (in which the components corresponding to those of FIG. 1 bear the same reference numerals followed by the prime index) differs essentially from the previous embodiment in the mode of restraint and application of stress to the wedge elements 28'. Said wedge elements are no longer coupled together by means of packing blocks or jacks and are restrained in a wholly independent manner by means of cables 60 which are stretched between the outer face of the vessel cylinder and the wedge elements. The abutment face can either be smooth as indicated in FIG. 5 or stepped. Only the jacks 40' which are located between the slab 26' and the wedge elements are retained whilst the jacks 38 are no longer necessary. The vessel end is mounted in a sequence of operations which are similar to those mentioned earlier and therefore call for no extended description. Nevertheless, it should be noted that in this alternative embodiment, the jacks 40' are locked and it is not necessary to release them at the time of pressure increase, any upward motion of the slab 26' being prevented by the wedge elements 28' which are stationary with respect to the vessel cylinder.

The invention is not limited to the modes of execution which have been illustrated and described by way of example and it must be understood that the scope of this patent extends to alternative forms of all or part of the arrangements herein described which remain within the definition of equivalent means.

What we claim is:

1. A prestressed concrete vessel affording resistance to the pressure developed within a compartment which is defined by said vessel, wherein said vessel comprises a cylindrical shell and end-walls, at least one end-wall being removable so as to leave an opening having a diameter of the same order as that of the compartment, and wherein said removable end-wall comprises:
    a bearing face formed on the vessel cylinder, said face being inclined to the axis and flared towards the exterior, and an abutment face which is also inclined to the axis, said bearing and abutment faces being disposed in this order from the interior to the exterior of the pressure vessel;
    a removable slab having a lateral surface which corresponds in shape to that of the bearing face;
    a pluarlity of wedge-shaped elements which are separated by spaces and each adapted to occupy an angular sector, said elements being applied and rigidly maintained against said abutment face; and a plurality of jacks mounted between the wedge elements and the slab and adapted to exert on said slab a variable force of application against the bearing face.

2. A pressure vessel according to claim 1, wherein said flared faces are either frusto-conical or frusto-pyramidal.

3. A pressure vessel according to claim 1, wherein said lateral surface is formed of material which is capable of being applied in sliding contact with the bearing face.

4. A pressure vessel according to claim 1, wherein said wedge-shaped elements are applied against the inwardly-flared abutment face by means of jacks placed between an annular cornice of the vessel cylinder and the wedge-shaped elements, said elements being separated by members which prevent them from coming together in the circumferential direction.

5. A pressure vessel according to claim 4, wherein the second jacks are provided with a synchronizing device which is adapted to reduce the pressure maintained therein progressively as the pressure rises within the pressure vessel.

6. A pressure vessel according to claim 1, wherein said wedge-shaped elements are applied against the outwardly-flared abutment face by means of cables or rods which pass through the vessel cylinder at right angles to the abutment face.

7. A pressure vessel according to claim 1, wherein the jacks are provided with locking means.

8. A pressure vessel according to claim 1, wherein said jacks are provided with a safety system which produces an increase in pressure within said jacks in the event of overpressure within the pressure vessel.

9. A pressure vessel according to claim 1, wherein a leak-tight lining membrane carried by the internal wall of the cylinder and a lining membrane carried by the slab are joined together either by means of a steel band fixed by welding or by direct application.

References Cited

UNITED STATES PATENTS

| | | | |
|---|---|---|---|
| 1,665,827 | 4/1928 | Tillmann | 220—3 |
| 3,293,139 | 12/1966 | Bellier | 52—224X |
| 3,353,859 | 11/1967 | Schupack | 52—224X |
| 3,389,516 | 6/1968 | Ziegler | 52—224 |
| 3,390,211 | 6/1968 | Ziegler | 52—224X |
| 3,397,503 | 8/1968 | Adler | 52—224X |

FOREIGN PATENTS

| | | | |
|---|---|---|---|
| 1,428,553 | 1/1966 | France | 52—224 |
| 659,287 | 10/1951 | Great Britain | 220—3 |
| 997,882 | 7/1965 | Great Britain | 176—Shield Digest |

ALFRED C. PERHAM, Primary Examiner

U.S. Cl. X.R.

52—208; 176—87